United States Patent
Shu et al.

(10) Patent No.: US 7,730,724 B2
(45) Date of Patent: Jun. 8, 2010

(54) TURBOCHARGER SHAFT OVER-SPEED COMPENSATION

(75) Inventors: Yong Shu, Northville, MI (US); Michiel J. Vvan Nieuwstadt, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 441 days.

(21) Appl. No.: 11/747,089

(22) Filed: May 10, 2007

(65) Prior Publication Data
US 2008/0276614 A1 Nov. 13, 2008

(51) Int. Cl.
F02B 33/44 (2006.01)
F02D 23/00 (2006.01)
F02D 43/00 (2006.01)

(52) U.S. Cl. ........... 60/605.1; 60/602
(58) Field of Classification Search ............ 60/598, 60/600–603, 605.1
See application file for complete search history.

(56) References Cited

U.S. PATENT DOCUMENTS

| | | | | |
|---|---|---|---|---|
| 2,629,541 A | * | 2/1953 | Couture | 60/602 |
| 3,329,132 A | * | 7/1967 | De Coye De Castelet | 123/559.1 |
| 5,386,698 A | * | 2/1995 | Kamel | 60/603 |
| 6,408,624 B1 | | 6/2002 | Books et al. | 60/601 |
| 6,539,714 B1 | | 4/2003 | Wang | 60/605.1 |
| 6,725,659 B1 | | 4/2004 | Shao et al. | 60/601 |
| 6,732,523 B2 | * | 5/2004 | Birkner et al. | 60/605.1 |
| 7,210,296 B2 | * | 5/2007 | Bolz et al | 60/598 |
| 2006/0032224 A1 | | 2/2006 | Akins et al. | 60/602 |

FOREIGN PATENT DOCUMENTS

| | | |
|---|---|---|
| DE | 4214648 A1 * | 11/1993 |
| EP | 0301888 | 7/1988 |
| JP | 2004/100620 | 4/2004 |
| KR | 070051980 | 11/2005 |
| WO | WO 2006020500 | 2/2006 |

OTHER PUBLICATIONS

European Patent Office, European Search Report of GB0808128.3, Jul. 14, 2008, EPO.

* cited by examiner

*Primary Examiner*—Thai Ba Trieu
(74) *Attorney, Agent, or Firm*—Julia Voutyras; Alleman Hall McCoy Russell & Tuttle LLP

(57) ABSTRACT

A method for controlling engine operation, the engine having a turbocharger coupled between an intake and exhaust manifold of the engine via a turbocharger shaft, the method comprising dynamically determining turbocharger shaft speed based at least on intake and exhaust manifold conditions using a torque balance across the turbocharger; and adjusting turbocharger boosting to adjust turbocharger shaft speed in response to said dynamically determined turbocharger shaft speed.

15 Claims, 3 Drawing Sheets

TURBOCHARGER SHAFT OVER-SPEED COMPENSATION

BACKGROUND AND SUMMARY

Engines of motor vehicles may use turbochargers to achieve various advantages in operation, such as increased torque, reduced fuel economy, etc. However, turbochargers may have limited operating regions.

Various approaches have been used for turbocharger boost control, and limiting of excessive turbocharger shaft speeds. One example is described in U.S. Pat. No. 6,539,714. In this example, an estimate of the turbocharger rotational speed is determined as a function of the compressor pressure ratio, the temperature signal and the engine speed signal.

The inventors have recognized several issues with such approaches, especially with regard to higher performance turbochargers that may be used that operate at higher loads and higher speeds. Further, using estimates based on prior approaches, typically generates larger estimates during transient dynamic conditions, thus resulting in a more conservative setting of turbocharger operation to reduce transient over-speed operation. In other words, due to issues of transient over-speed operation, system typically limit boost levels below that actually. For example, with regard to the example approach indicated above, transient errors may be generated because only intake conditions are considered, or because there is no dynamic compensation.

Thus, in order to address at least some of the above issues, dynamic compensation for turbocharger over-speed shaft protection may be used. In one specific example, the operation may include intake and exhaust flow dynamics, as well as turbocharger dynamics. In this way, more accurate, and dynamic, over-speed compensation may be used to more accurately limit engine and/or boost operation to limit shaft speed during dynamic turbocharger operation As another example, an accurate estimate of turbocharger shaft speed can be determined based on a dynamic observer which uses a turbocharger torque balance as a dynamic term and a turbocharger steady state map as a static term, thereby including both the intake and exhaust side dynamics together with turbine shaft speed dynamics.

DETAILED DESCRIPTION

Figure 1:
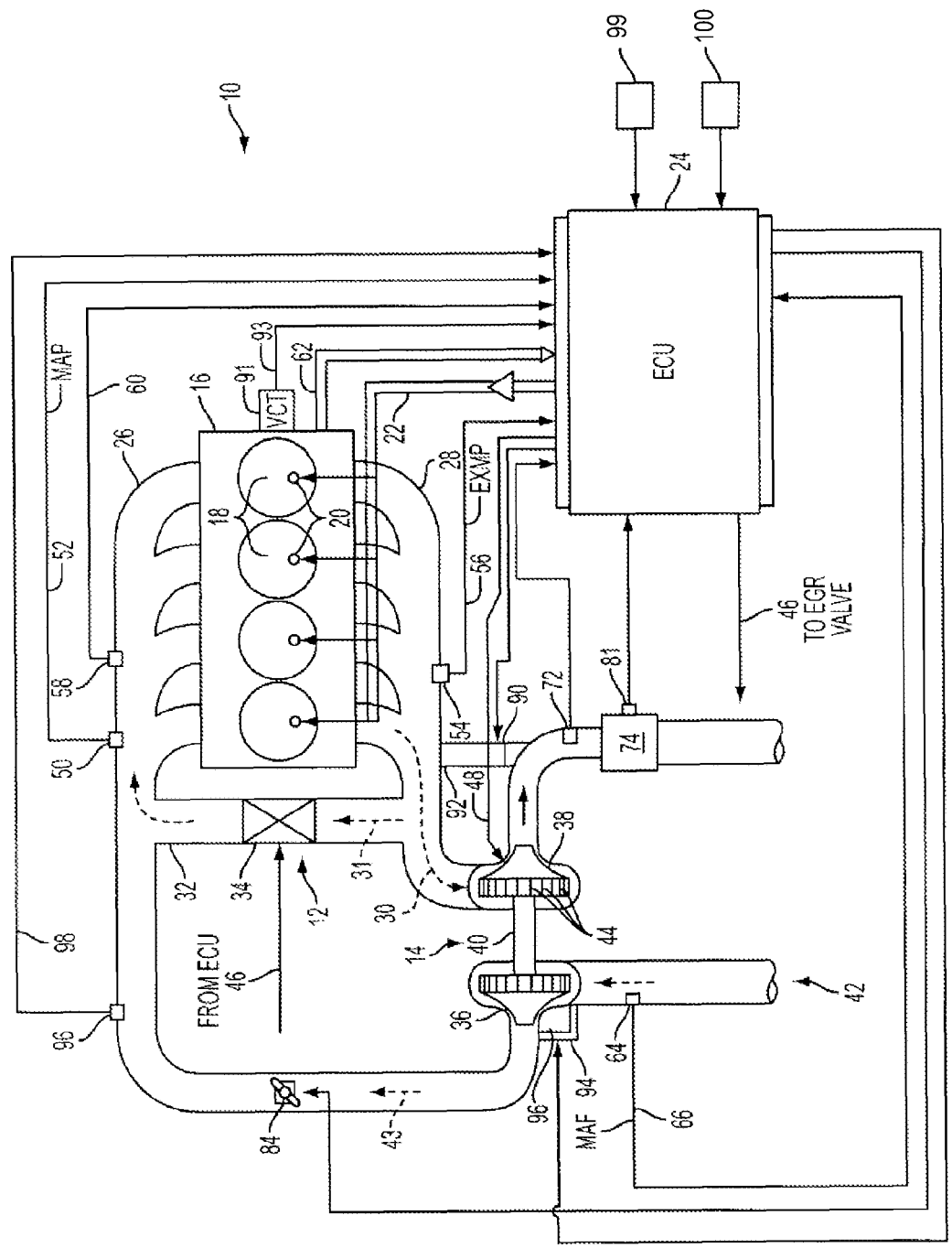
FIG. 1 shows a simplified schematic diagram of a diesel engine system equipped with an exhaust gas recirculation system and a variable geometry turbocharger.

FIG. 1 shows a simplified schematic diagram of a diesel engine system 10 equipped with an exhaust gas recirculation (EGR) system 12 and a variable geometry turbocharger (VGT) 14. The turbocharger may be a high performance turbocharger designed to operate at higher speeds and loads for sustained durations or at sustained temperatures, for example. While this example shows a variable geometry turbocharger, a turbocharger having an adjustable wastegate 90 in bypass 92 around the turbine side may also be used as indicated in FIG. 1. Also, a bypass 94 may be provided around the compressor side, having an adjustable valve 96 located therein.

A representative engine block 16 is shown having four combustion chambers 18, although more or fewer cylinders may be used if desired. Each of the combustion chambers 18 includes a direct-injection fuel injector 20. The duty cycle of the fuel injectors 20 may be determined by the engine control unit (ECU) 24 and transmitted along signal line 22. For example, a common rail direct injection system may be used.

Air enters the combustion chambers 18 through the intake manifold 26, and combustion gases are exhausted through the exhaust manifold 28 in the direction of arrow 30.

In the depicted embodiment, the intake valves and exhaust valves (not shown) may be actuated by a fixed cam or by variable cam timing (VCT) 91 via signal line 93. In some examples, variable valve lift (VVL), cam profile switch (CPS), among other valve control systems may be used to adjust operation of one or more of the intake and/or exhaust valves. Alternatively, electric valve actuators (EVA) may be used to control operation of intake and exhaust valves, respectively. Each valve may be configured with a valve position sensor (not shown) that can be used to determine the position of the valve.

To reduce the level of NOx emissions, the engine may be equipped with an EGR system 12. EGR system 12 may comprise a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. The valve 34 may be a throttle plate, pintle-orifice, slide valve, or any other type of variable valve.

In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture by reducing excess oxygen.

Turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 includes a compressor 36 and a turbine 38 coupled by a common turbocharger shaft 40. The exhaust gas 30 drives the turbine 38 which drives the compressor 36 which, in turn, compresses ambient air 42 and directs it (arrow 43) into the intake manifold 26. The VGT 14 can be modified as a function of various operating parameters, including engine speed, during engine operation by varying the turbine flow area and the angle at which the exhaust gas 30 is directed at the turbine blades. This can be accomplished by changing the angle of the inlet guide vanes 44 on the turbine 38. The operating position for the engine guide vanes 44 may be determined from the desired engine operating characteristics at various engine speeds and loads by ECU 24, or as described in further detail herein with regard to FIGS. 2-4.

An aftertreatment device 74 may be disposed downstream of the turbine 38. Aftertreatment device 74 may include any suitable type of device for reducing emissions from engine 10. Examples include, but are not limited to, three-way catalytic converters, NOx traps, oxidation catalyst, particulate filters, selective catalytic reduction catalysts, etc. In one example, the aftertreatment device is a diesel particulate filter. ECU 24 may be configured to periodically raise the temperature of particulate filters to regenerate the filters.

One or more of the engine systems, such as the EGR systems 12 and VGT 14, throttle valves 84, and fuel injectors 20 may be controlled by a control system including the ECU. For example, signal 46 from the ECU 24 regulates the EGR valve position, and signal 48 regulates the position of the VGT guide vanes 44.

In the ECU 24, the command signals 46, 48 to the EGR system 12 and VGT 14 actuators, as well as other command signals, may be calculated from measured variables and engine operating parameters. Sensors and calibratable lookup tables may be used to provide the ECU 24 with engine operating information. For example, manifold absolute pressure (MAP) sensor 50 provides a signal 52 to the ECU 24 indicative of the pressure in the intake manifold 26 downstream of the EGR entrance, and pressure sensor 96 provides a signal 98 indicative of pressure upstream of the EGR entrance in the intake manifold. Likewise, exhaust manifold pressure (EXMP) sensor 54 provides an EXMP signal 56 to the ECU 24 indicative of the pressure in the exhaust manifold 28 upstream of the EGR exit. Further, an air charge temperature sensor 58 provides a signal 60 to the ECU 24 indicative of the temperature of the intake air charge 42. A mass airflow (MAF) sensor 64 also provides signals 66 indicative of the airflow in the intake system to the ECU 24.

In addition, exhaust gas oxygen concentration, which can be indicative of air-fuel ratio, can be provided by oxygen sensor 72. Additional sensory inputs can also be received by the ECU along signal line 62, such as engine coolant temperature, engine speed, and throttle position. Further, ECU 24 is shown to receive signals from a gas pedal position from sensor 99 and a brake pedal position from sensor 100.

Exhaust gas sensor 72 is shown upstream of an aftertreatment device 74. Exhaust gas sensor 72 may be any of many known sensors for providing an indication of exhaust gas air/fuel ratio such as a linear oxygen sensor, a two-state oxygen sensor, or a hydrocarbon (HC) or carbon monoxide (CO) sensor. In this particular example, sensor 38 is a two-state oxygen sensor that provides signal EGO to controller 12 which converts signal EGO into two-state signal EGOs.

Controller 24 may determine the temperature of aftertreatment device 74 in a variety of ways. For example, the temperature may be inferred from engine operation. In an alternate embodiment, temperature may be determined from temperature sensor 81.

It should be understood that FIG. 1 merely shows one example multi-cylinder engine, and that each cylinder has its own set of intake/exhaust valves, fuel injectors, etc.

It should further be understood that the depicted diesel engine 10 is shown only as an example, and that the systems and methods described herein may be implemented in or applied to other suitable engines having various components and/or arrangement of components.

In one embodiment, engine operation is controlled using an estimate of turbocharger shaft speed. As noted herein, accurate control of transient rotational speed of the turbocharger may be used to advantage in systems having high performance turbocharger operation, as well as for turbocharger protection control strategies. In this way, turbocharger operation may be controlled to stay within the manufacturers limits, which are defined by the use of the relevant flow maps. While the use of look up tables to limit operation may be useful, the pressure sensors typically used to measure the pressure produced by the turbocharger in the engine air intake system may be too indirect and slow to provide an accurate indication of turbocharger transient performance. On the other hand, measurement of the turbocharger shaft speed, while direct, may be difficult due to the harsh ambient and difficult sealing conditions around the turbocharger. As such, a more accurate estimate of turbocharger shaft speed can be beneficial, even if used in addition to direct speed measurement or a supplement to look-up table based control.

An accurate determination or estimate of turbocharger shaft speed may be based on a dynamic observer, thereby eliminating the need for a sensor, or supplementing sensor information. In one example, the observer may based on a turbocharger torque balance (as a dynamic term) and one or more turbocharger maps (as a static term). Such an approach can include the intake and exhaust side together with turbine shaft speed. The observer feedback gains may be determined using an extended Kalman filter, as one example. Such an observer can provide an estimate of turbocharger shaft speed with reduced transient delays, while also providing an accurate match to mapped data in steady state.

In some cases, accuracy may be further improved by including an integral term at steady state to compensate for model errors. For example, such an approach can compensate for complexities in the turbine and compressor torque calculations.

Further details of example an example observer is described below with regard to FIGS. 2-3.

Figure 2:
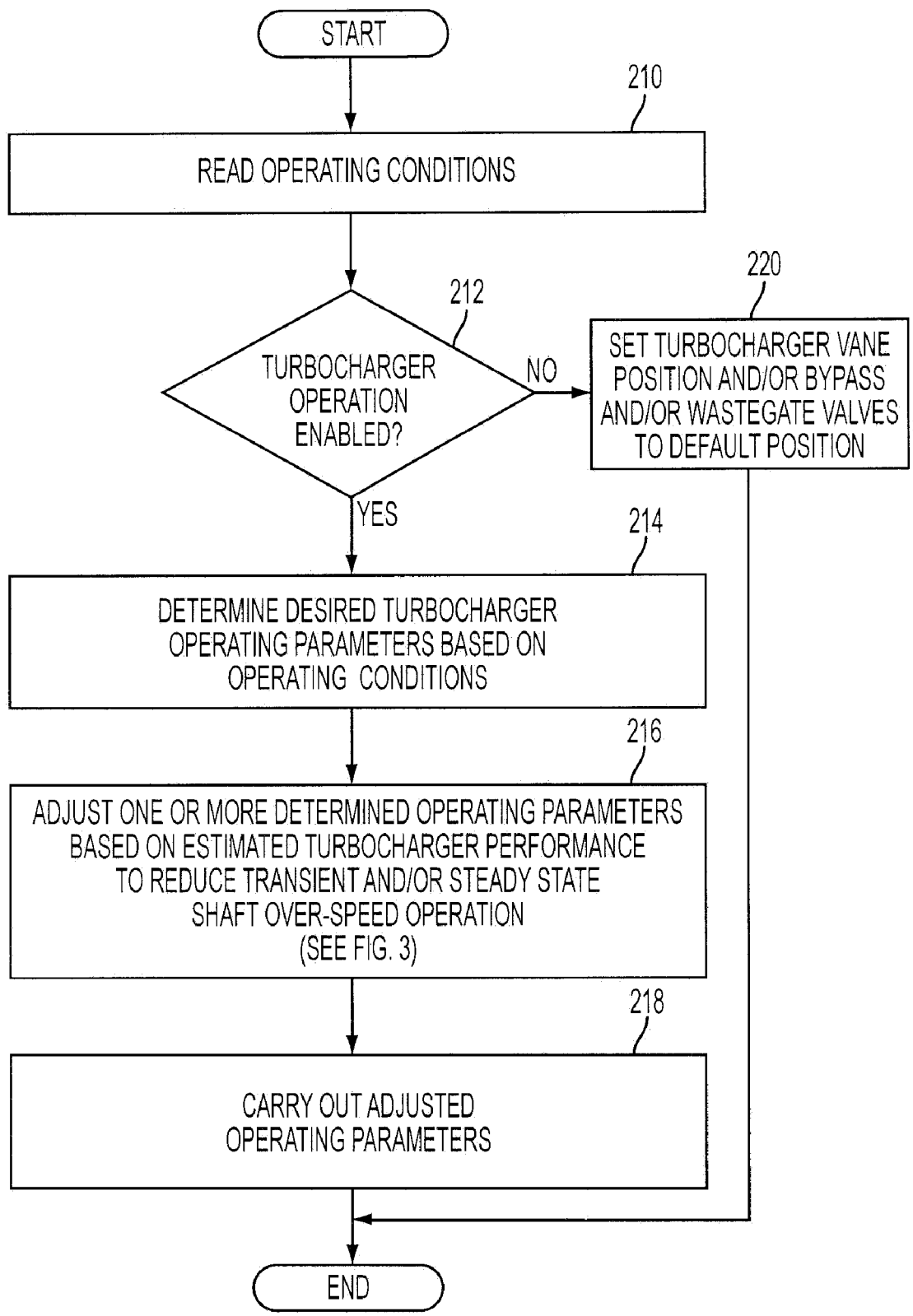
FIG. 2 is a flow diagram for controlling engine and turbocharger operation.

Referring now to FIG. 2, a routine is described for controlling engine and turbocharger operation. In 210, the routine reads various operating conditions, which may include atmospheric pressure (patm), manifold pressure (MAP), exhaust manifold pressure (pexh), exhaust temperatures, intake charge temperatures, engine speed, throttle position, and others. Next, in 212, the routine determines whether turbocharger operation is enabled. If not, the routine continues to 220 to set the turbocharger vane position and/or bypass and/or wastegate valves to a default position, which may be at a minimum boosting operation position. Otherwise, the routine continues to 214.

In 214, the routine determines desired turbocharger operating parameters based on operating conditions. For example, the routine may determine a desired boosting level, desired vane position, desired bypass amount, desired wastegate position, desired throttle positions, desired airflow and/or others based on desired engine torque, engine speed, and/or engine load. In one particular example, the routine may determine desired throttle positions and vane positions to provide a desired pressure ratio across the turbine. In another particular example, the routine may determine desired throttle positions and vane positions to provide a desired airflow to the cylinders.

In 216, the routine adjusts one or more determined operating parameters from 214 based on estimated turbocharger performance (e.g., based on estimated turbocharger shaft speed) to reduce transient and/or steady state shaft over-speed operation. Then, in 218, the adjusted parameters are carried out by sending appropriate control signals from the control system to the actuators. Further, the routine may adjust other engine operating parameters to counteract any torque reduction caused by the speed limiting operation. For example, fuel injection amount and/or timing may be temporarily increased during adjustment due to over-speed operation.

Figure 3:
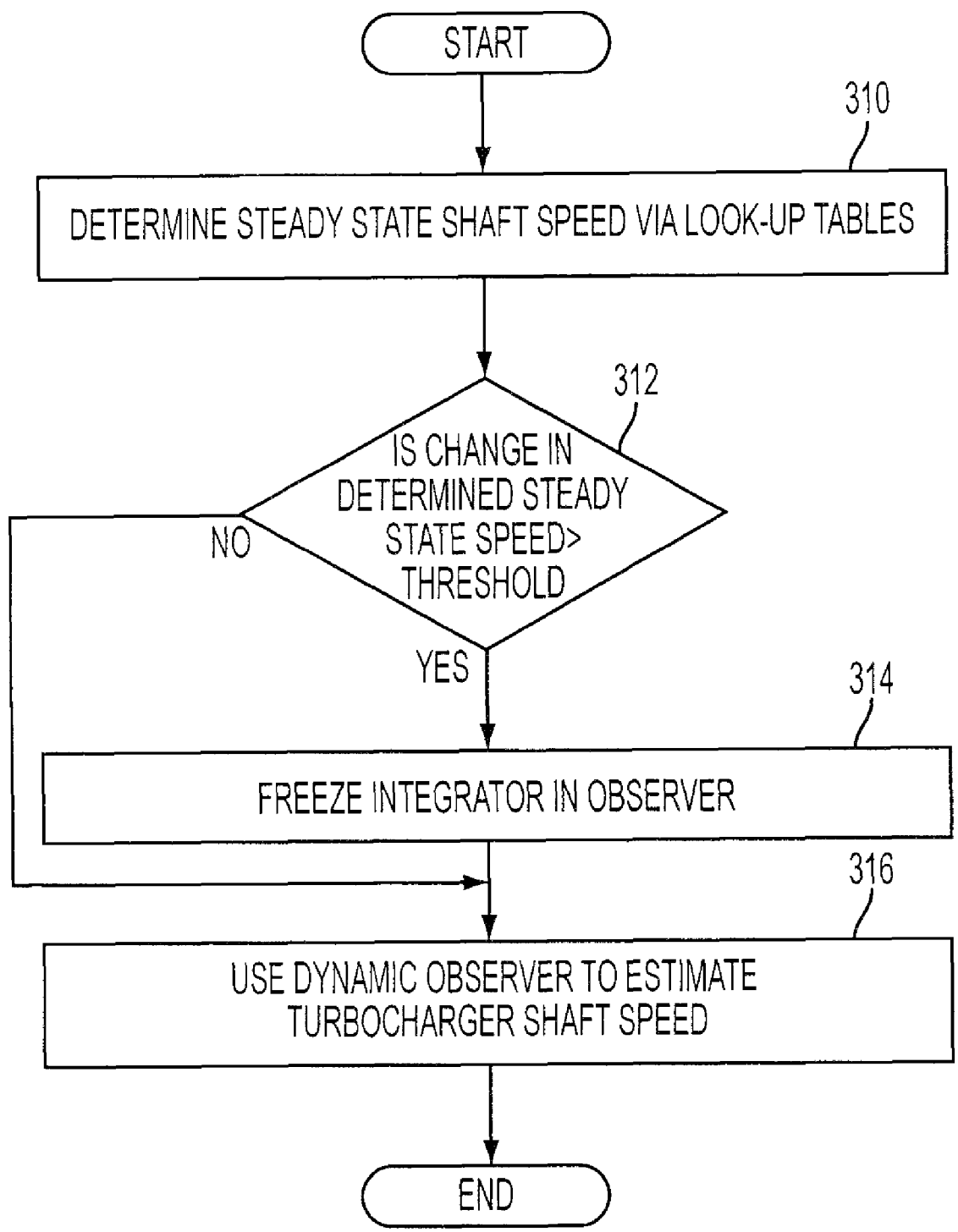
FIG. 3 is a flow diagram for using estimated shaft speed to adjust vane position of the turbocharger.

In one embodiment, an estimated shaft speed is used as described with regard to FIG. 3 to adjust vane position to reduce boosting if the estimated shaft speed exceeds a limit value, where the limit value may vary with operating conditions such as temperature. For example, the routine may adjust the vane position to reduce shaft speed. In another example, the routine may temporarily increase wastegate opening to reduce a transient shaft over-speed condition. In still another example, the routine may temporarily increase a bypass around the compressor to reduce a transient shaft over-speed condition. In still another example, the routine may temporarily reduce intake airflow (e.g., by closing an intake manifold throttle and/or by adjusting valve operation of a variable cylinder valve timing and/or lift system) to reduce shaft speed. Further, combinations of adjustments maybe used, such as those just noted.

Referring now to FIG. 3, a routine is described for dynamically determining turbocharger shaft speed based at least on intake and exhaust manifold conditions using a torque balance across the turbocharger. As noted above, an observer based on a torque balance across the turbocharger may be used along with an additional integral feedback term.

Specifically, in 310, the routine determines an estimated steady state shaft speed via look-up tables and turbocharger mapping information. In one example, the steady state speed ($\tilde{\omega}$) can be determined based on a functions (e.g., manufacturer compressor tables) of pressure ratio of the compressor and the mass airflow in the compressor (e.g., MAF) at the current condition. For example, the following equation may be used:

$$\tilde{\omega} = f(pr\_comp, maf\_red)$$

Next, in 312, the routine determines whether a change in the determined steady state speed compared to a previous value is greater than a threshold amount. If so, the routine continues to 314 to freeze the integrator in the observer. In particular, the integral term may add over and/or undershoot when settling into steady state. However, as the integral term is used primarily in steady state, it can be turned off or reduced during transient conditions via 312. Otherwise, the routine continues to 316 to interrogate the observed to update the dynamic shaft speed estimate as indicated below. In one particular example, the observer may lead to turbocharger shaft speed by using energy conservation law:

$$J_{tc} \cdot \frac{d\omega}{dt} = M_t - M_c$$

$$M_c = \frac{\dot{m}_c}{\omega \cdot \eta_{c,is}} \cdot c_{pi} \cdot T_{in} \cdot \left[ \prod_c^{\frac{k_i-1}{k_i}} - 1 \right]$$

$$M_t = \frac{1}{\omega} \dot{m}_t \cdot c_{pe} \cdot \eta_{t,is} \cdot T_{em} \cdot \left[ 1 - \prod_t^{\frac{1-k_e}{k_e}} \right]$$

Where,
ω—turbocharger shaft speed
$J_{tc}$—inertia of the turbocharger shaft
$T_{in}$—temperature of compressor inlet air
$T_{em}$—temperature of tubine inlet gas
$\dot{m}_c$—compressor air mass flow rate
$\dot{m}_t$—turbine gas mass flow rate
$C_{pa}$—specific heat of air
$C_{pe}$—specific heat of exhaust gas
$\eta_{c,is}$—adiabatic efficiency of the compressor
$\eta_{t,is}$—adiabatic efficiency of the turbine
$\Pi_c$—pressure ratio of the compressor
$\Pi_t$—pressure ratio of the turbine The observer may then be designed as:

$$\frac{d\omega}{dt} = \frac{1}{J_{tc}}(M_t - M_c) + K_p(\tilde{\omega} - \omega) + K_i \int (\tilde{\omega} - \omega) dt$$

Calculation of turbocharger shaft speed in the discrete time domain:

$$\omega^{n-1} = \omega^n + (M_t^n - M_c^n) \cdot \frac{\Delta t}{J_{tc}} + K_p \cdot \Delta t \cdot (\omega^n - \tilde{\omega}^n) + K_i \cdot \Delta t \cdot [x^n]$$

where $$\tilde{\omega}^n = \text{look\_up}(pr\_comp, maf\_red)$$

$$x^n = x^{n-1} + (\tilde{\omega}^{n-1} - \omega^{n-1}) \cdot \Delta t$$

Further, Δt is the time step between the update of the observer calculation. In this way, it is possible to estimate transient turbocharger shaft speed, and when this dynamic estimate exceeds a value, actions can be taken to temporarily limit the speed, such as opening the a vane position or bypass valve. This can improve turbocharger over-speed compensation at altitude, thus enabling more aggressive turbocharger operation at both sea level and altitude. Further, this can enhance turbocharger life by reducing transient over-speed conditions. Further, still, this can lead to better robustness to modeling errors because of a closed loop observer design and steady state stabilization.

In addition to monitoring and reducing turbocharger shaft over-speed conditions, the estimate may also be used for model-based diagnosis, such as monitoring vane position, wastegate conditions, etc.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an engine having a turbocharger coupled between an intake and exhaust manifold of the engine via a turbocharger shaft, comprising:
   dynamically determining turbocharger shaft speed based at least on intake and exhaust manifold conditions using a torque balance across the turbocharger; and
   adjusting turbocharger boosting to limit turbocharger shaft speed to be below a threshold value in response to said dynamically determined turbocharger shaft speed, even during transient turbocharger conditions.

2. The method of claim 1 wherein said adjusting includes adjusting a turbocharger wastegate.

3. The method of claim 1 wherein said adjusting includes adjusting a variable geometry turbocharger position.

4. The method of claim 1 further comprising dynamically determining turbocharger shaft speed additionally using feedback based on steady state turbocharger maps.

5. The method of claim 4 wherein said feedback includes integration.

6. The method of claim 5 wherein said integration is adjusted based on turbocharger operation.

7. The method of claim 6 wherein said dynamically determining is based on turbocharger inertia, compressor airflow, turbine airflow, and temperature.

8. A method for controlling engine operation, the engine having a turbocharger coupled between an intake and exhaust manifold of the engine via a turbocharger shaft, the method comprising:
   dynamically estimating turbocharger shaft speed based on intake and exhaust flow and turbocharger inertia using a torque balance across the turbocharger, said dynamic estimate including feedback based on steady state turbocharger mapping data, said feedback including an integrated term;
   adjusting said integrated term based on a change in steady state turbocharger operation using steady state mapping data; and
   adjusting turbocharger boosting to limit turbocharger shaft speed in response to said dynamically estimated turbocharger shaft speed.

9. The method of claim 8 wherein said adjusting limits turbocharger shaft speed, even during transient turbocharger conditions, to be below a threshold value.

10. The method of claim 9 wherein said adjusting includes adjusting a turbocharger wastegate.

11. The method of claim 9 wherein said adjusting includes adjusting a variable geometry turbocharger position.

12. The method of claim 8 wherein said dynamically determining is based on turbocharger inertia, compressor airflow, turbine exhaust flow, and temperature.

13. The method of claim 12 wherein the engine is a diesel engine.

14. A system comprising:
   a diesel engine;
   a variable geometry turbocharger having a turbocharger shaft coupled between an intake and exhaust of the diesel engine;
   a controller for dynamically determining turbocharger shaft speed based at least on intake and exhaust manifold conditions using a torque balance across the turbocharger and adjusting turbocharger boosting via vane position to limit turbocharger shaft speed in response to said dynamically determined turbocharger shaft speed, the controller accounting for altitude effects on dynamic and steady state turbocharger operation, the controller determining manifold pressure, exhaust pressure, and atmospheric pressure to dynamically determine turbocharger shaft speed, and the controller further including an integral action to reduce steady state error.

15. The system of claim 14 where the controller further adjusts engine operation during said limiting of shaft speed to reduce engine output torque effects.

* * * * *